(12) United States Patent
De Amorim Novais Da Costa Nobrega et al.

(10) Patent No.: US 10,053,579 B2
(45) Date of Patent: Aug. 21, 2018

(54) METHOD FOR PREPARING COATED BINDER UNITS

(75) Inventors: João Miguel De Amorim Novais Da Costa Nobrega, Braga (PT); José António Colaço Gomes Covas, Braga (PT); Chantal Soubigou, Petit Couronne (FR); Eurico Filipe Dias Pessoa, Braga (PT); Bruno Henrigue Rodrigues Barros, Britelo (PT); Catherine Rodrigues, Colombes (FR)

(73) Assignee: SHELL OIL COMPANY, Houston, TX (US)

( * ) Notice: Subject to any disclaimer, the term of this patent is extended or adjusted under 35 U.S.C. 154(b) by 171 days.

(21) Appl. No.: 14/123,862

(22) PCT Filed: Jun. 7, 2012

(86) PCT No.: PCT/EP2012/060820
§ 371 (c)(1),
(2), (4) Date: Jan. 20, 2014

(87) PCT Pub. No.: WO2012/168380
PCT Pub. Date: Dec. 13, 2012

(65) Prior Publication Data
US 2014/0174643 A1    Jun. 26, 2014

(30) Foreign Application Priority Data
Jun. 7, 2011    (EP) .................................... 11305705

(51) Int. Cl.
*C08L 95/00*    (2006.01)
*E01C 7/18*    (2006.01)
(Continued)

(52) U.S. Cl.
CPC .......... *C08L 95/00* (2013.01); *B29C 47/0023* (2013.01); *B29C 47/065* (2013.01); *B32B 38/0004* (2013.01); *E01C 7/18* (2013.01); *B32B 37/0046* (2013.01); *B32B 38/1866* (2013.01); *Y10T 156/1062* (2015.01); *Y10T 156/12* (2015.01); *Y10T 156/1313* (2015.01); *Y10T 156/1788* (2015.01)

(58) Field of Classification Search
USPC ......... 264/297.1, 297.3, 297.5, 297.6, 297.7, 264/297.8, 149; 156/515
See application file for complete search history.

(56) References Cited

U.S. PATENT DOCUMENTS 1,258,849 A * 3/1918 Zwoyer ...................... C10L 5/36
44/530
1,879,293 A * 9/1932 Jones ...................... B30B 11/16
425/237

(Continued)

FOREIGN PATENT DOCUMENTS

CN    102066068    6/2011
EP    179510    4/1986
(Continued)

*Primary Examiner* — Linda L Gray
(74) *Attorney, Agent, or Firm* — Charles W. Stewart

(57) ABSTRACT

A method and apparatus for preparing a plurality of coated binder units are disclosed. A coated binder is divided into a plurality of coated binder units by applying a pair of dividing elements to the coated binder and applying a welding element.

10 Claims, 3 Drawing Sheets

(51) Int. Cl.
    *B32B 38/04*    (2006.01)
    *B29C 47/00*    (2006.01)
    *B29C 47/06*    (2006.01)
    *B32B 38/00*    (2006.01)
    B32B 38/18    (2006.01)
    B32B 37/00    (2006.01)

(56) References Cited

U.S. PATENT DOCUMENTS

| | | | | |
|---|---|---|---|---|
| 1,991,319 A * | 2/1935 | Finley | ............... | E01C 7/18 |
| | | | | 106/280 |
| 2,073,907 A * | 3/1937 | Scullin | ............... | E01C 7/18 |
| | | | | 106/280 |
| 3,026,568 A | 3/1962 | Moar | | |
| 3,091,012 A | 5/1963 | Bell | | |
| 4,165,960 A * | 8/1979 | Lemelson | ........ | A44B 18/0049 |
| | | | | 425/145 |
| 4,315,885 A * | 2/1982 | Lemelson | ........ | A44B 18/0049 |
| | | | | 264/297.3 |
| 5,223,200 A * | 6/1993 | Schulz | ............ | B26D 7/084 |
| | | | | 264/145 |
| 5,254,385 A | 10/1993 | Hazlett | | |
| 7,476,347 B1 * | 1/2009 | Sun | ............... | A61K 6/09 |
| | | | | 264/18 |
| 2008/0015288 A1 | 1/2008 | Antoine et al. | | |
| 2008/0242770 A1 | 10/2008 | Thomas | | |
| 2008/0257479 A1 | 10/2008 | Usui et al. | | |

FOREIGN PATENT DOCUMENTS

| | | |
|---|---|---|
| EP | 1361256 | 11/2003 |
| GB | 265644 | 2/1927 |
| WO | 2009153324 | 12/2009 |
| WO | 2011067355 | 6/2011 |

* cited by examiner

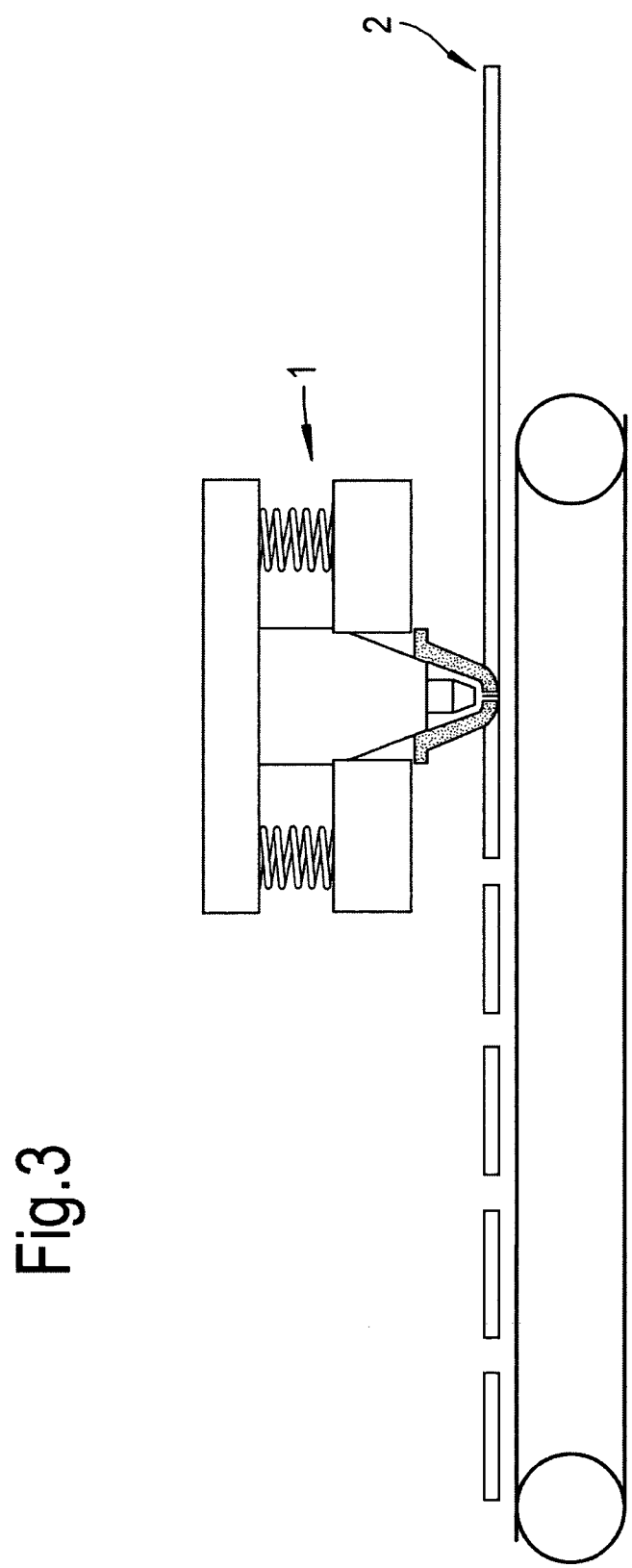

METHOD FOR PREPARING COATED BINDER UNITS

PRIORITY CLAIM

The present application is a National Stage (§ 371) application of International Application No. PCT/EP2012/060820, filed 7 Jun. 2012, which claims the benefit of European Application No. 11305705.3, filed 7 Jun. 2011, the disclosures of which are incorporated herein by reference.

FIELD OF THE INVENTION

The invention relates to a method for preparing coated binder units.

BACKGROUND OF THE INVENTION

Bitumen is a viscous liquid or a solid consisting essentially of hydrocarbons and their derivatives. It is soluble in trichloroethylene and softens gradually when heated. Bitumen is used as a binder in a variety of applications. Bitumen may be combined with aggregate to provide asphalt that can be used in the manufacture of roads. Alternatively, bitumen may be used in industrial applications such as roofing, flooring or sealing.

In recent years synthetic binders have also been used. Synthetic binders, such as Shell's Mexphalte C®, possess similar rheological and mechanical properties to the bituminous binders typically used in road applications. The synthetic binders are typically clear, so they are readily pigmented and are used to obtain coloured asphalt. In this description, the term "binder" covers both bituminous materials and synthetic materials having similar rheological and mechanical properties. The term "asphalt" in the present description is used to describe a mixture of binder and aggregate.

Bituminous and synthetic binders are typically transported in the heated state to ensure that they are sufficiently fluid for use. However, this is costly in terms of energy usage and requires strict safety procedures. Also, if the binder is stored at elevated temperature for an extended period this can lead to changes in the properties of the binder, so storage time is typically limited to avoid degradation in binder properties.

It is desirable to transport and store the binder at ambient temperature, preferably as units of a size and shape that are readily handled. The term "unit" as used in the present description encompasses a wide variety of discrete solid entities such as pellets, rods, sheets etc. However, the binders tend to be extremely sticky so that the units creep and agglomerate, particularly when stored at ambient temperature for extended periods. Efforts have been made to produce binder units that are not subject to agglomeration.

U.S. Pat. No. 3,026,568 describes a process wherein coated bitumen pellets are prepared by spraying molten bitumen into a stream of air carrying a powdered material such as powdered limestone. The purpose of the coating is to prevent the pellets from adhering to one another. It has proved difficult to practise this method on an industrial scale.

U.S. Pat. No. 5,254,385 describes encapsulated asphalt (bitumen) articles wherein bitumen is contained inside a polymer cover. A polymeric material is heat sealed to form a three side container or pouch, molten bitumen is poured into the pouch, and the remaining opening of the container is closed by heat sealing. The encapsulation prevents separate bitumen elements from agglomerating, adhering or coalescing to form larger masses of bitumen. The encapsulation process is likely to be slow, and is probably too costly to be applied on a large scale.

EP 1 361 256 describes a method for preparing granules wherein an oil is mixed with polyethylene, a bituminous material is added, and the resulting mixture is subjected to mixing extrusion. The resulting granules can be described as a mixture of a polyethylene phase and a bituminous phase in which the polyethylene phase is a semi-continuous phase and the bitumen phase is a discontinuous phase. A high proportion of polymer in the granules is needed to prevent deformation of the granules, and this may detrimentally alter the properties of the bitumen and/or may increase the cost of the granules such that they are unlikely to be economical.

US 2008/0015288 describes an extrusion process for preparing master batch granules comprising bitumen and polymer. To prevent the granules from sticking, an anti-sticking agent may be included in the granules, e.g. by adding the anti-sticking agent directly to the extruder, or the anti-sticking agent may be applied to the surface of the extrudate as it cools on leaving the extruder. Again, a high proportion of polymer in the granules is needed to prevent deformation of the granules, and this may detrimentally alter the properties of the bitumen and/or may increase the cost of the granules such that they are unlikely to be economical.

WO 2009/153324 describes an extrusion process wherein a binder and a coating material are co-extruded, thereby producing an extrudate wherein the binder is coated with a layer of coating material. The extrudate may be divided into smaller units by hot cutting. The coating material may be re-melted during hot cutting such that the edges of the binder unit are sealed with the coating material.

The present inventors have sought to provide an alternative method of preparing binder units that can be transported at ambient temperatures and are not subject to creep and agglomeration.

SUMMARY OF THE INVENTION

Accordingly the present invention provides a method for preparing a plurality of coated binder units wherein each of the coated binder units comprises a core of a binder coated with a layer of coating material, which method comprises the steps of:
(a) providing a coated binder which comprises a core of a binder coated with a layer of coating material; and
(b) dividing the coated binder into the plurality of coated binder units by
(i) applying a pair of dividing elements to the coated binder,
(ii) moving the pair of dividing elements from a closed configuration to an open configuration, thereby removing the binder from a region of the coated binder such that two layers of coating material are adjacent to one another; and
(iii) applying a welding element to the region of the coated binder wherein the binder has been removed by the pair of dividing elements and the two layers of coating material are adjacent to one another, thereby welding and cutting the two layers of coating material.

The present invention further provides an apparatus for preparing a plurality of coated binder units wherein each of the coated binder units comprises a core of a binder coated with a layer of coating material, comprising:
a pair of dividing elements having a closed configuration and an open configuration, which may be applied to the coated binder and moved from the closed configuration to the open configuration, thereby removing the binder from a region of the coated binder such that two layers of coating material are adjacent to one another; and
a welding element which may be applied to the region of the coated binder wherein the binder has been removed by the pair of dividing elements and the two layers of coating material are adjacent to one another, thereby welding and cutting the two layers of coating material.

The method and apparatus of the invention can be used to prepare coated binder units that are not subject to agglomeration and that can be transported and stored for extended periods at ambient temperature. In particular, the inventors have found that by removing the binder from a region of the coated binder such that two layers of coating material are adjacent to one another, and by welding and cutting the two layers of coating material, the coated binder units are effectively sealed in a layer of coating material. This seal is robust and helps to ensure that the coated binder units do not agglomerate.

BRIEF DESCRIPTION OF THE DRAWINGS

FIG. 3 shows another embodiment of the apparatus and process of the invention.

DETAILED DESCRIPTION OF THE INVENTION

Figure 1B:
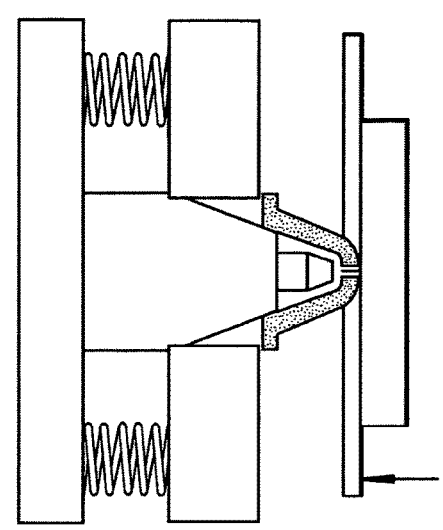
FIG. 1 shows a preferred embodiment of the apparatus and process of the invention.
Figure 1D:
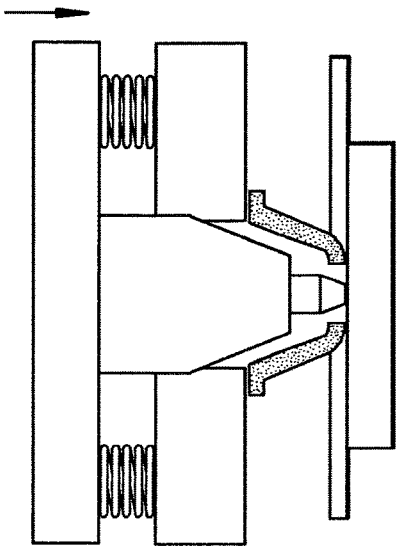
Figure 1A:
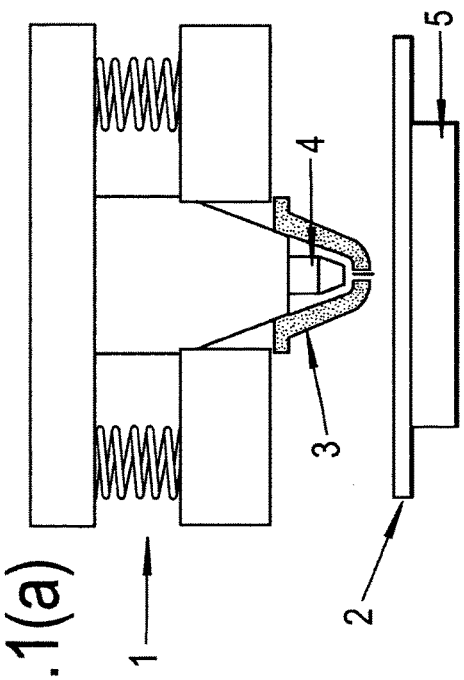
Figure 1C:
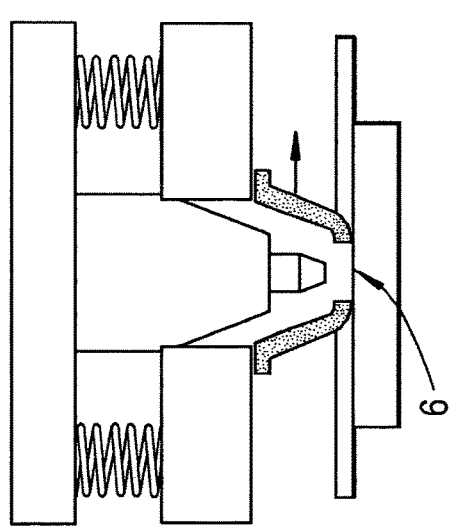

The coated binder can suitably be any type of coated binder that comprises a core of a binder coated with a layer of coating material. Suitably, the coated binder is an extrudate obtained by co-extruding the binder and the coating material. Extrusion is a process wherein a material is pushed through a die of the desired shape. In co-extrusion, two or more materials are extruded simultaneously. Preferably the extrudate is in the form of rods of coated binder, having a central core of binder and a layer of coating material around the entire central core of the binder. The cross-section of the rod may be, e.g. circular, oval or rectangular. In another suitable embodiment the binder has been incorporated in a pre-formed layer of the coating material, e.g. the coated binder may have been prepared by filling a pre-formed shape of coating material (tube of circular, rectangular or complex shape).

The coated binder units comprise a core of binder coated with a layer of coating material. The coated binder units may have any desired shape. In one embodiment of the invention, the units are pellets, having a central core of binder and an outer layer of coating material. The exact shape of the coated binder units can vary, but desirably the coated binder units are of a shape and size such that they are readily handled and transported. Pellets have the advantages usually associated with the storage, flow, and handling of granular materials.

The binder is preferably a bituminous binder or is a synthetic binder having similar rheological and mechanical properties to a bituminous binder. The penetration at 25° C. of the binder (as measured according to EN 1426) is preferably between 0 and 350, more preferably between 10 and 250 dmm. The softening point of the binder (as measured according to EN 1427) is preferably between 30 and 140° C., more preferably between 35 and 95° C.

More preferably, the binder is a bituminous binder. Suitable bituminous binders include residues from the distillation of crude oil, cracked residues, naturally occurring bitumens or blends of various bitumen types. Examples of bituminous binders that may be conveniently used in the present invention include distillation or "straight run" bitumen, precipitation bitumen, e.g. propane bitumen, oxidised or blown bitumen, naphthenic bitumen or mixtures thereof. The bituminous binder may be prepared by blending a bitumen with a flux oil, e.g. an aromatic, napthenic or paraffinic flux oil, or a vegetable oil.

In an alternative embodiment, the bituminous binder may also comprise a polymer such that the binder is a polymer-modified bitumen. Suitable polymers include thermoplastic elastomers and plastomers, e.g. styrenic block copolymers and/or olefinic copolymers such as ethylene vinyl acetate. The polymer can be from petroleum or renewable origin, or rubber recovered from, for example, recycled tyres. The binder preferably contains up to 40 wt % modifiers such as polymers, based upon the weight of the binder, more preferably up to 15% modifiers.

In an alternative embodiment, the binder is a synthetic binder. The synthetic binder comprises a resin, an oil and optionally a polymer. The resin may be a resin of vegetable origin such as a rosin ester. Alternatively, the resin may be a petroleum resin or a coumarone-indene resin. The resin may have been modified such that it contains carboxylic acid, carboxylic acid anhydride or hydroxyl groups, as described in EP 179 510. The oil may be a vegetable oil or a mineral lubricating oil extract, e.g. a Bright-Stock extract.

The binder may comprise a filler material. The filler material may be any mineral material wherein the particle size is smaller than 75 μm. The binder may comprise up to 20 wt % filler, based upon the weight of the binder.

The binder may comprise sulphur, in amount of from 0.01 to 80 wt %, based upon the weight of the binder, more preferably from 0.01 to 50 wt %.

In one embodiment of the invention, the binder comprises a slip agent which is incorporated to facilitate removal of the binder during step (ii) of the process. Suitable slip agents might include a lubricant such as erucamide or oleamide.

The coating material is a material that inhibits agglomeration of the coated binder units when the units are stored at ambient conditions. The coating material may improve the aesthetic aspects of the coated binder units (e.g. may be coloured), may provide information (e.g. may be printed with text or an image) and/or may improve the binding functions of the binder.

The coating material is preferably a polymer, bitumen having a penetration at 25° C. of less than 5 dmm, sulphur, blends of these materials with filler materials, blends of these materials with fibre materials, and blends of two or more of these materials. More preferably the coating material is a polymer or a blend comprising at least 50 wt % polymer. The polymer may be of renewable origin and/or may be biodegradable and/or be a recycled material. In one embodiment, the coating material is a polyolefin such as polyethylene or polystyrene, or is a blend comprising at least 50 wt % polyolefin. Preferably the coating material is polyethylene or a blend comprising at least 50 wt % polyethylene. In another embodiment, the coating material is a thermoplastic elastomer or plastomer, or a blend comprising at least 50 wt % of a thermoplastic elastomer or plastomer. In this embodiment the polymer is used both as a coating material (to inhibit agglomeration of the units) and as a component of the binder formulation, improving the properties of the product that will be made from the binder. The thermoplastic elastomer or plastomer may be a styrenic block copolymer, olefinic copolymer such as ethylene vinyl acetate, polyurethane or polyether-polyester copolymer.

The coating material may contain additives that enhance the properties of asphalt that is produced from the coated binder units.

The coated binder unit may comprise further additives, e.g. softening agents such as wax or penetration index boosters such as waxes, polyphosphoric acid and ethylene polymers. However, in a preferred embodiment the coated binder unit consists essentially of the binder and the coating material.

The melting point of the coating material is preferably lower than 200° C. to prevent emissions from the binder, more preferably below 180° C., most preferably below 160° C. to provide easy subsequent melting.

The layer of coating material in the coated binder units of the invention is preferably substantially continuous, such that at least 90% of the surface area of the core of binder is coated with the coating material, more preferably at least 95%, most preferably all of the surface area.

The weight ratio of binder to coating material is preferably at least 5:1, more preferably at least 10:1, most preferably at least 30:1. It is desirable to minimise the quantity of coating material if the coating material is a more expensive component than the binder material. If the coating material is a polymer, the polymer may be chosen such that it has positive effects on the resulting binder product and the amount of coating material may be a balance between improved properties and cost. Where the coating material is a thermoplastic elastomer or plastomer, a suitable weight ratio of binder to coating material is between about 99:1 and 9:1.

The average thickness of the layer of coating material is preferably at least 10 μm. The layer needs to be sufficiently thick to avoid leakage of the binder. The average thickness of the layer of coating material can suitably be in the range of from 0.01 to 5 mm, preferably in the range of from 0.05 to 0.5 mm. Preferably, the thickness of the layer is less than 3 mm, more preferably is less than 1 mm and most preferably less than 0.4 mm. A layer thicker than 3 mm is not preferred if it is desirable to minimise the quantity of coating material.

Suitably, the hydraulic diameter of the core of binder is in the range of from 5 to 100 mm, preferably in the range of from 10 to 50 mm.

The cross-section of the coated binder units may be a variety of shapes, e.g. circular, oval, polygonal, scarre, etc. The average hydraulic diameter of the coated binder units is preferably less than 200 mm, more preferably less than 80 mm, yet more preferably less than 50 mm.

In the process of the invention, the coated binder is divided into the plurality of the coated binder units. Suitably the coated binder is supported by a platform. Preferably this platform may be heated, e.g. to a temperature between 60 and 165° C. The platform is any structure that supports the coated binder, e.g. a moving belt could provide the platform.

A pair of dividing elements is applied to the coated binder. The pair of dividing elements may be applied to the coated binder by moving the pair of dividing elements towards the stationary coated binder. Alternatively, the pair of dividing elements may be applied to the coated binder by moving the coated binder towards the stationary pair of dividing elements.

Suitably the pair of dividing elements is made from metal, e.g. steel or aluminium, preferably steel. Metal dividing elements have suitable mechanical resistance and conductivity properties.

The dividing elements are preferably heated to assist with removing the binder from a region of the coated binder. However, if the dividing elements are too hot they may start to melt the coating material such that there is unwanted welding prior to removal of the binder from a region of the coated binder. Preferably the temperature of the dividing elements is from 25 to 100° C., more preferably from 40 to 60° C.

The pair of dividing elements is moved from a closed configuration to an open configuration, thereby removing the binder from a region of the coated binder such that two layers of coating material are adjacent to one another. The binder is suitably removed from a region of the coated binder by downward pressure and lateral movement of the dividing elements. In the open configuration the dividing elements are suitably separated by at least 1 mm, preferably at least 5 mm and preferably less than 20 mm. In a preferred embodiment of the invention, the pair of dividing elements is "V"-shaped when in the closed configuration, with each dividing element forming one arm of the "V"; when moving to the open configuration, the arms of the "V" move in opposite, lateral directions.

A welding element is applied to the region of the coated binder wherein the binder has been removed by the pair of dividing elements and the two layers of coating material are adjacent to one another, thereby welding and cutting the two layers of coating material. The welding of the two layers effectively seals the coated binder units such that the layer of coating material is substantially continuous and there cannot be leakage of the binder. The welding element may be applied to the coated binder by moving the welding element towards the stationary coated binder. Alternatively, the welding element may be applied to the coated binder by moving the coated binder towards the stationary welding element. In a preferred embodiment of the invention the welding element is connected to a piston, and action of the piston forces the welding element towards the coated binder.

Suitably the welding element is made from metal, e.g. steel, aluminium or metal alloys, preferably steel. A metal welding element has suitable mechanical resistance and conductivity properties.

The welding element is heated to enable welding and cutting of the coating material. Preferably the welding element is heated to a temperature of from 100 to 300° C., more preferably from 110 to 200° C. and most preferably from 120 to 165° C. The preferred temperature needs to be sufficient to weld and cut the coating material.

The welding element is applied to the region of the coated binder wherein the binder has been removed by the pair of dividing elements and the two layers of coating material are adjacent to one another, for a period of time sufficient to weld and cut the two layers of coating material. This period of time is likely to be from 1 to 10 seconds, more preferably from 4 to 6 seconds.

In one embodiment of the invention, the welding element is preferably coated with a non-stick coating such as polytetrafluoroethylene. Alternatively, a sheet of non-stick material, such as polytetrafluoroethylene film, may be positioned between the welding element and the coated binder. This helps to avoid adhesion of the coating material to the welding element.

The width of the welding element at the point where it contacts the coated binder is preferably from 0.5 to 19 mm, most preferably about 6 mm. This width must be thinner than the gap between the dividing elements in the open configuration, i.e. if the gap between the dividing elements is 10 mm, the width of the welding element should be less than 10 mm.

Preferably the step (b) in the process of the invention comprises the further step of:
(iv) removing the welding element and the pair of dividing elements from the coated binder, and returning the pair of dividing elements to the closed configuration.
And preferably, steps (i) to (iv) are repeated to provide a plurality of coated binder units.

In a preferred embodiment of the invention, the process is automated such that large quantities of coated binder units may be produced at a higher rate and with optimal reproducibility. In one embodiment, the apparatus of the invention is stationary and the coated binder is fed to the apparatus by a moving belt. In another embodiment, the apparatus of the invention, preferably in the form of multiple sets of dividing elements and welding elements, is mounted on a moveable belt. The coated binder may be carried on another moveable belt and fed to apparatus of the invention.

FIG. 1 shows a preferred embodiment of the apparatus and process of the invention. The apparatus (1) of the invention is positioned above the coated binder (2) in FIG. 1(a). The apparatus has a pair of dividing elements (3) and a welding element (4). The coated binder is supported on a platform (5). From FIG. 1(a) to FIG. 1(b), the pair of dividing elements (3) is moved downwards in order to contact the coated binder (2). From FIG. 1(b) to FIG. 1(c) the pair of dividing elements (3) is moved from a closed to an open configuration, thereby removing binder from a region of the coated binder (shown as (6)). From FIG. 1(c) to FIG. 1(d), the welding element (4) is moved downwards such that it is applied to the region of coated binder (6) wherein binder has been removed. In this region, two layers of coating material are now adjacent, and these layers become welded in the step shown in FIG. 1(d) and are cut.

Figure 2:
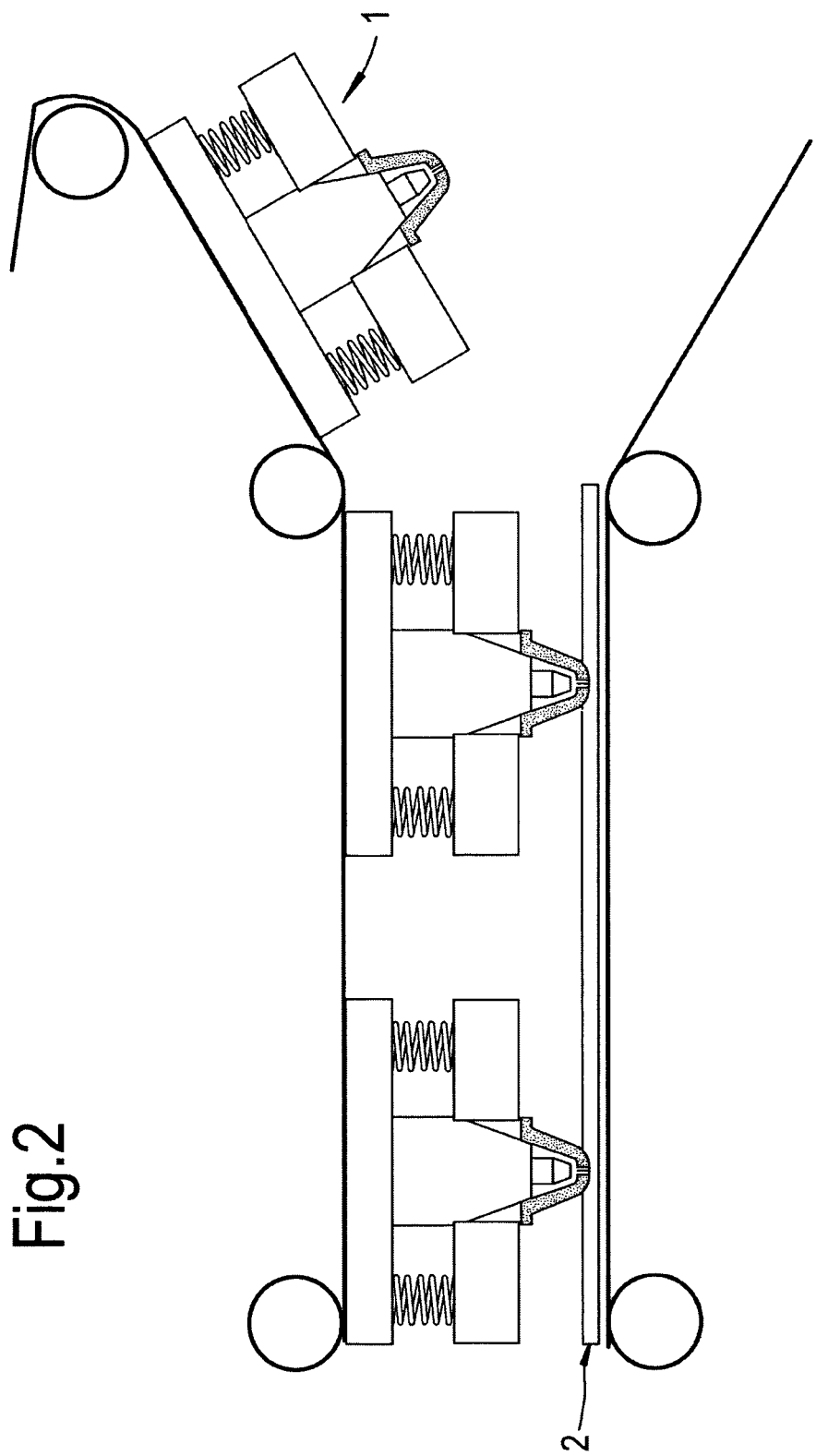
FIG. 2 shows another embodiment of the apparatus and process of the invention.

FIG. 2 shows another embodiment of the apparatus and process of the invention. The apparatus (1) of the invention is made up of a number of sets of dividing elements and welding elements, mounted on a belt. The coated binder (2) is supported by another belt and is fed to the apparatus (1).

FIG. 3 shows another embodiment of the apparatus and process of the invention. The apparatus (1) of the invention is stationary. The coated binder (2) is supported by a moving belt and is fed to the apparatus (1).

The coated binder units produced according to the method of the invention are suitably combined with aggregate to provide asphalt. The asphalt can be used to form asphalt pavement in conventional pavement-laying processes or alternatively can be used in joining processes such as forming joints between the gaps between paving stones or cobblestones.

Examples

The invention is further illustrated by means of the following non-limiting examples.

An apparatus substantially as shown in FIG. 1 was assembled. The dividing elements were V-shaped and made of steel. The welding element was also made of steel. The apparatus was used to divide a rod of coated binder into coated binder pellets. The rod had been made by co-extrusion of binder and coating material. The binder was a 160-220 grade bitumen, having a penetration of 160-220 dmm at 25° C. The coating material was a low density polyethylene (FT5236 available from Borealis). The amount of coating material as a weight percentage of the bitumen was 3.3 wt %.

A sheet of PTFE film was placed between the apparatus and the rod of coated binder.

The dividing elements were heated, applied to a coated binder and moved from a closed to an open configuration, thereby removing bitumen from a region of the coated binder. The cycle time was approximately 6 seconds. The inventors found that a temperature of 120° C. was insufficient to move the bitumen, but when the dividing elements were at 130° C. or 140° C., the dividing elements successfully removed bitumen from a region of the coated binder.

The welding element was applied to the region of the coated binder wherein the binder had been removed by the pair of dividing elements and the two layers of coating material were adjacent to one another, thereby welding and cutting the two layers of coating material. The temperature of the welding element was 165° C. or 170° C.

Repeated applications of the dividing elements and welding element successfully divided the coated binder rod into coated binder pellets. The coating layer on the coated binder pellets was substantially complete and the coated binder pellets were not subject to agglomeration.

What is claimed is:

1. A method for preparing a plurality of coated binder units wherein each of the coated binder units comprises a core of a binder coated with a layer of coating material, which method comprises the steps of:
   (a) providing a coated binder which comprises a core of a binder coated with a layer of coating material; and
   (b) dividing the coated binder into the plurality of coated binder units by
      (i) applying a pair of dividing elements to the coated binder,
      (ii) moving the pair of dividing elements from a closed configuration to an open configuration, thereby removing the binder from a region of the coated binder such that two layers of coating material are adjacent to one another; and
      (iii) applying a heated welding element to the two layers of coating material that are adjacent to one another in the region of the coated binder wherein the binder has been removed by the pair of dividing elements, wherein the heated welding element has a temperature sufficient to weld and cut the coating material and effectively seal the coated binder units such that the layer of coating material is substantially continuous.

2. A method according to claim 1, wherein the binder is a bituminous binder or is a synthetic binder comprising a resin, an oil and optionally a polymer.

3. A method according to claim 2, wherein the binder is a bituminous binder.

4. A method according to claim 1, wherein the coating material is a polymer or a blend comprising at least 50 wt % polymer.

5. A method according to claim 1, wherein the dividing elements are heated to a temperature of from 25 to 140° C.

6. A method according to claim 1, wherein the welding element is heated to a temperature of from 100 to 300° C.

7. A method according to claim 1, wherein step (b) further comprises the step of:
   (iv) removing the welding element and the pair of dividing elements from the coated binder, and returning the pair of dividing elements to the closed configuration.

8. A method according to claim 4, wherein the coating material is polyethylene or a blend comprising at least 50 wt % polyethylene.

9. A method according to claim 5, wherein the dividing elements are heated to a temperature of from 40 to 60° C.

10. A method according to claim 6, wherein the welding element is heated to a temperature of from 120 to 165° C.

* * * * *